2,889,330
PYRIDYLETHYL THIOPHOSPHATES

Joseph W. Baker, Nitro, and Kenneth L. Godfrey, St. Albans, W. Va., assignors to Monsanto Chemical Company, St. Louis, Mo., a corporation of Delaware No Drawing. Application August 24, 1955
Serial No. 530,424

15 Claims. (Cl. 260—294.8)

The present invention relates to a new group of chemical products of the class describable as phosphorothioates and to the method of producing the same. More particularly, the invention relates to the new products of the class named which are pyridylethyl esters of a thiophosphoric acid and which more specifically are pyridylethyl or alkyl substituted pyridylethyl esters of O,O-dialkyl thiophosphoric acid.

The new compounds are represented by the following general formula:

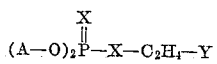

wherein A represents an alkyl group and preferably an alkyl group containing not more than three carbon atoms, X represents either sulfur or oxygen, at least one of which is sulfur and Y represents a nitrogen containing heterocyclic ring which may or may not be substituted by an alkyl group. Since the compounds containing the group Y are more or less basic in nature, the invention comprises also quaternary ammonium derivatives, for example, the hydrochlorides or methyl sulfate adducts of the products disclosed. The products of the class named have been found to possess desirable and effective properties as contact and systemic insecticides. The method of application of several typical products of the described class of compounds will be set forth hereinafter.

Several typical procedures whereby products included in the class of phosphorothioates are obtainable are set forth in the following examples of the invention.

Example 1

Into a flask equipped with an agitator, thermometer and reflux condenser, there were charged 26.3 parts (0.25 mole) of 2-vinylpyridine. Thereupon over a period of approximately 30 minutes there were added 67.8 parts (0.25 mole) of O,O-bis-(2-methoxyethyl)phosphorodithioate of substantially 91% strength. During the addition of the phosphorodithioate the temperature of the mixture was held below 20° C. but was increased to 100° C. and maintained thereat for approximately an hour to complete the reaction. During the entire process described agitation was of course effected. Following the heating step described, the mass was cooled to room temperature and the product was dissolved in about 200 parts of benzene. The benzene extract was washed first with water, then twice with 10% sodium carbonate solution and finally with water again. The benzene was then removed under reduced pressure and the residual product clarified by filtration through a suitable clay. The product obtained was a yellow to orange liquid soluble in acetone, benzene, chloroform and ethyl alcohol, partially soluble in heptane, ether and ethyl acetate and insoluble in water. The equation whereby the product, O,O - bis - (2-methoxyethyl) S-[2-(2-pyridylethyl)dithiophosphate], is obtained is as follows:

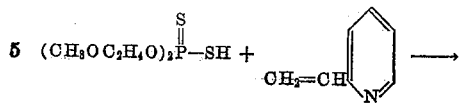

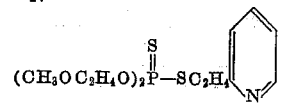

Example 2

As another example of the preferred class of chemical compounds, O,O-diisopropyl S[2-(2-pyridyl)ethyl] phosphorodithioate was obtained by the reaction of 31.5 parts (0.3 mole) of redistilled 2-vinylpyridine and 67.5 parts (0.35 mole) of O,O-diisopropyl phosphorodithioate of 99% purity. Employing the same apparatus as described in the previous example, the vinylpyridine was added to the indicated thioacid at 0–30° C. over a period of about 30 minutes with external cooling. The viscous reaction mixture was then heated rapidly to about 100° C. and held thereat for about an hour and then cooled. The mass was quenched with water, separated and given a wash with 3% sodium carbonate solution, followed by another water wash. Each wash was extracted with benzene and the benzene finally removed by distillation at 100° C. under 10 mm. vacuum. The product was a clear yellow color insoluble in water and soluble in ether, acetone, benzene, chloroform, ethanol and ethyl acetate. The product was analyzed to confirm the composition $C_{13}H_{22}NO_2PS_2$ with the following results:

| | Theory, percent | Found, percent |
|---|---|---|
| Nitrogen | 4.4 | 5.4 |
| Phosphorus | 9.7 | 9.7 |
| Sulfur | 20.1 | 18.7 |

The reaction whereby the product was obtained follows:

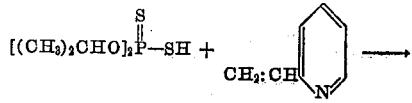

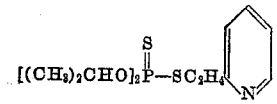

Example 3

Operating as described in the two previous examples, O,O-dimethyl S-2(2-pyridyl)ethyl phosphorodithioate,

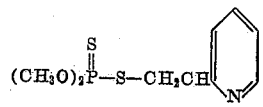

was obtained by reacting 31.5 parts (0.3 mole) of 2-vinylpyridine with 54.0 parts (0.3 mole) of 87.8% O,O-dimethyl phosphorodithioate.

Example 4

Proceeding in the same type equipment and following the procedure of Example 1, 52.6 parts (0.5 mole) of 2-vinylpyridine were added dropwise with stirring at temperatures between 0–10° C. to 93.2 parts (0.5 mole) of O,O-diethyl phosphorodithioate. After the mixture was complete, the temperature was increased to about 100° C. and held thereat for about 45 minutes. After cooling, the mixture was extracted with about 200 parts of benzene, the benzene extract was water washed and then given three successive washes with 5% sodium carbonate solution and another water wash. The benzene solution was then distilled to remove the solvent by heating to 120° C. under 10 mm. vacuum and a light yellow liquid product was obtained. Analysis confirmed the empirical formula $C_{11}H_{18}NO_2PS_2$ as is apparent from the following results:

|  | Theory, percent | Found, percent |
|---|---|---|
| Phosphorus | 10.7 | 10.6 |
| Sulfur | 22.0 | 20.6 |
| Nitrogen | 4.8 | 4.89 |

The reaction is represented by the following equation:

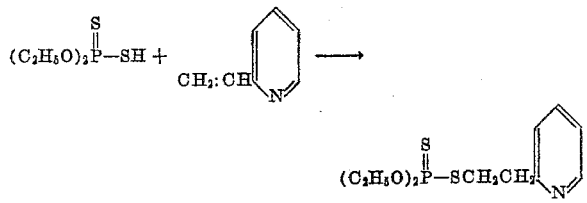

Example 5

Repeating the process described in Example 4, but employing as a charge 76.5 parts (0.4 mole) of O,O-diethyl phosphorodithioate and 23.8 parts (0.2 mole) of 2-methyl-5-vinylpyridine, a reaction resulted as shown by the following equation:

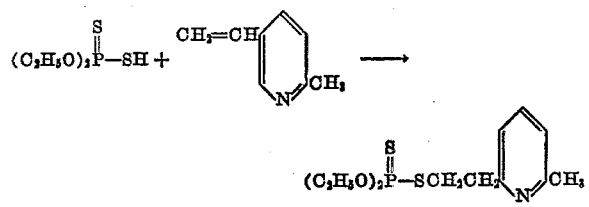

Example 6

As another example of the process and following the method of the previous Example 5, the reaction of equimolar ratios of O,O-diethyl phosphorodithioate and 4-vinylpyridine proceeded as indicated by the following equation:

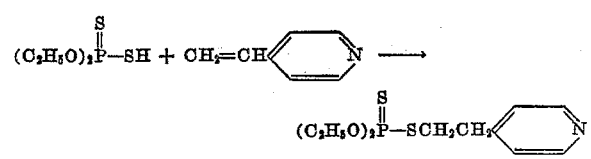

Example 7

Another example of the invention is the following procedure in which 93.1 parts (0.5 mole) of O,O-diethyl phosphorochloridothioate, 61.5 parts (0.5 mole) of 2-(2-hydroxyethyl)-pyridine, 250 parts of water-free methyl ethyl ketone, 2 parts of copper powder and 53 parts (0.5 mole) of dry sodium carbonate were mixed in a container equipped with a reflux condenser, an agitator and a thermometer. The mixture was agitated and then heated to a refluxing temperature and held thereat (93–98° C.) for about 8 hours. After cooling to room temperature, the by-product salts were removed by filtration, the solvent was removed under reduced pressure, and the residue then dissolved in benzene. The benzene solution was extracted with a 10% aqueous solution of soda ash, washed with water and the benzene was removed under reduced pressure (110° C. and 6 mm. vacuum). The product remaining was a dark brown liquid, insoluble in water and soluble in benzene, ether, acetone, chloroform, ethyl acetate and ethanol. Analysis of the product confirmed the expected formula $C_{11}H_{18}NO_3PS$ as is shown by the results:

|  | Theory, percent | Found, percent |
|---|---|---|
| Phosphorus | 11.2 | 11.8 |
| Sulfur | 11.6 | 10.94 |
| Nitrogen | 5.1 | 4.48 |

The reaction involved is a follows:

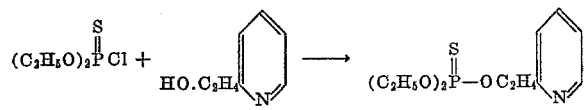

Example 8

Another product of the present invention, O,O-diethyl S - [2 - (5 - ethyl - 2 - pyridyl)ethyl]dithiophosphate was obtained by following the procedure of Example 1 and employing as a charge 40 parts (0.3 mole) of 2-vinyl-5-ethylpyridine and 57.4 parts (0.3 mole) of O,O-diethyl phosphorodithioate. The product was an amber liquid and exhibited the same behavior toward solvents as did the product of Example 2. Analysis of the product compared with theory for the formula $C_{13}H_{22}NO_2PS_2$ as is shown by the results following:

|  | Theory, percent | Found, percent |
|---|---|---|
| Phosphorus | 9.70 | 9.96 |
| Sulfur | 20.07 | 19.36 |
| Nitrogen | 4.39 | 3.92 |

The equation showing the course of the reaction follows:

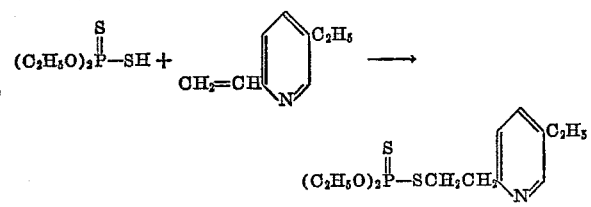

Example 9

The invention also comprises within its socpe the inorganic acid salts of the described pyridylethyl substituted dithiophosphates as is evidenced by the following example. Substantially 5.9 parts of the product obtained as described in Example 8 were dissolved in approximately 150 parts of anhydrous ether and a small quantity of ethereal hydrogen chloride was added thereto with gentle agitation. The oily product which separated was removed from the ether and was washed with three separate portions of about 50 parts of dry ether. After the final ether wash, gentle vacuum was applied to the washed product for a period of about 24 hours to remove all traces of residual ether, whereupon the temperature was raised to about 50–55° C. for 30 minutes. The resulting product was a yellow viscous material and on analysis was found to contain 10.27% chlorine as compared with a theory content of 11.77%. The product is the hydrochloride of O,O-diethyl S-[2-(5 - ethyl - 2 - pyridyl)ethyl]dithiophosphate and is represented by the following formula:

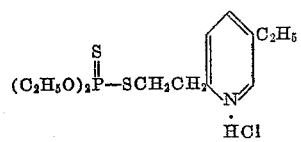

As illustrative of the insecticidal activity of the new class of products, the product obtained in Example 8 resulted in a 100% kill of milkweed bug, tribolium and carpet beetle larvae by the residue in a Petri dish sprayed with a 1% solution while a spray of only 0.1% concentration resulted in 40% kill. The same product in 0.1% concentration resulted in 100% kill of adult 2-spotted mite when sprayed on infested plants and a moderate destruction of eggs. All eggs were destroyed by a concentration of 0.2% of the product as stated.

Likewise there resulted a 100% kill of milkweed bug by the residue left in a Petri dish sprayed with a 0.1% solution of the product obtained as described in Example 1. The product obtained by the process described in Example 4 hereof, developed a 100% kill of milkweed bug by the residue on a Petri dish sprayed with a concentration of 0.05% of the product and a kill of 90% from the residue from a spray of 0.025% concentration.

By dipping plants in solutions of the indicated concentration of Example 4, holding the treated plant for 7 days and then infesting with the insects named, there were observed the following percentage of kills:

Southern army worm _____ 100% (1–1000)
Mexican bean beetle larvae _____ 100% (1–4000)
Thrips on beans _____ 100% (0.1%)

The same product of Example 4 was tested as a systemic insecticide by immersing excised stems of bean plants in emulsions of the chemical for 3 days. The leaves were then cut off, infested with the chosen insect and the percent kill noted after 48 hours. With an emulsion of 0.001% concentration, a kill of 100% of Mexican bean beetle larvae was noted, and a kill of 80% with a concentration of 0.0005%.

It is intended to cover all changes and modifications of the examples of the invention chosen for purposes of disclosure which do not constitute departures from the spirit and scope of the invention.

What is claimed is:

1. A compound of the structure

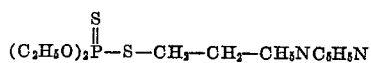

representing 2-pyridyl attached to the ethylene at a carbon atom.

2. A compound of the structure

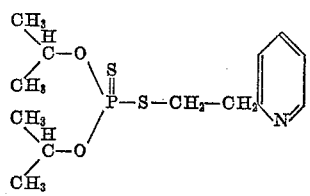

3. An O,O-diethyl phosphorodithioate containing a pyridylethyl group the C₅H₅N radical being linked to the ethyl radical at a ring carbon atom.

4. An O,O-diethyl phosphorodithioate containing a methyl substituted pyridylethyl group the methyl pyridyl radical being linked to the ethyl radical at a ring carbon atom.

5. The method which comprises reacting a vinylpyridine with an O,O-di-lower alkyl phosphorodithioate.

6. The method of claim 5 wherein the vinylpyridine is 2-vinylpyridine.

7. The method of claim 5 wherein the vinylpyridine is 2-vinyl-5-ethyl pyridine.

8. A compound of the structure

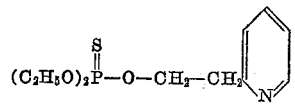

9. The method which comprises reacting O,O-diethyl phosphorodithioate with 2-vinylpyridine.

10. The method of claim 9 wherein the reaction is carried out in substantially equimolar proportions.

11. The hydrochloride of an O,O-diethyl S-pyridylethyl phosphorodithioate.

12. A compound of the structure

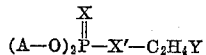

where A is selected from a group consisting of lower alkyl and lower alkoxy substituted lower alkyl radicals, X and X' are selected from a group consisting of oxygen and sulfur at least one of which is sulfur and Y is selected from a group consisting of pyridyl and lower alkyl substituted pyridyl radicals having a carbon atom in the pyridine ring attached to the ethylene group.

13. A compound of the structure

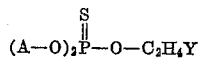

where A represents an alkyl radical containing less than four carbon atoms and Y represents the pyridyl radical attached to the ethylene group at a carbon atom in the pyridine ring.

14. A compound of the structure

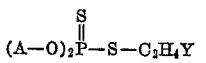

where A represents an alkyl radical containing less than four carbon atoms and Y represents the pyridyl radical attached to the ethylene group at a carbon atom in the pyridine ring.

15. A compound of the structure

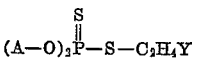

where A represents an alkyl radical containing less than four carbon atoms and Y represents a lower alkyl substituted pyridyl radical attached to the ethylene group at a carbon atom in the pyridine ring.

References Cited in the file of this patent

UNITED STATES PATENTS 2,706,194     Morris et al. _____ Apr. 12, 1955
2,754,302     Gysin et al. _____ July 10, 1956

UNITED STATES PATENT OFFICE
CERTIFICATE OF CORRECTION

Patent No. 2,889,330                     June 2, 1959

Joseph W. Baker et al.

It is hereby certified that error appears in the printed specification of the above numbered patent requiring correction and that the said Letters Patent should read as corrected below.

Column 5, lines 37 to 41, claim 1 should read as shown below instead of as in the patent:

A compound of the structure

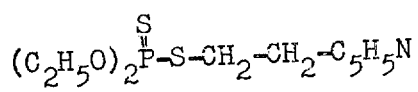

$C_5H_5N$ representing 2-pyridyl attached to the ethylene at a carbon atom.

Signed and sealed this 6th day of October 1959.

(SEAL)
Attest:

KARL H. AXLINE

Attesting Officer

ROBERT C. WATSON
Commissioner of Patents